United States Patent
Stadler et al.

(10) Patent No.: US 8,232,687 B2
(45) Date of Patent: Jul. 31, 2012

(54) INTELLIGENT LASER INTERLOCK SYSTEM

(75) Inventors: Andrew D. Stadler, San Francisco, CA (US); David Goldman, Napa, CA (US); Mark Farley, Napa, CA (US); Michael Mielke, Orlando, FL (US)

(73) Assignee: Raydiance, Inc., Petaluma, CA (US)

( * ) Notice: Subject to any disclaimer, the term of this patent is extended or adjusted under 35 U.S.C. 154(b) by 340 days.

(21) Appl. No.: 11/740,874

(22) Filed: Apr. 26, 2007

(65) Prior Publication Data
US 2007/0253455 A1 Nov. 1, 2007

Related U.S. Application Data

(60) Provisional application No. 60/796,646, filed on Apr. 26, 2006.

(51) Int. Cl.
*F16P 3/20* (2006.01)

(52) U.S. Cl. ... 307/328; 372/8; 372/29.011; 372/29.014; 372/38.01; 372/38.02; 372/38.03; 372/38.04; 372/38.05; 372/38.06; 372/38.07; 372/38.08; 372/38.09

(58) Field of Classification Search .................. None
See application file for complete search history.

(56) References Cited

U.S. PATENT DOCUMENTS

| | | | |
|---|---|---|---|
| 2,436,662 A | 2/1948 | Norgaard | |
| 3,459,960 A | 8/1969 | Aaland et al. | |
| 3,549,256 A | 12/1970 | Brienza et al. | |
| 3,599,019 A * | 8/1971 | Nannichi et al. | 372/8 |
| 3,602,836 A | 8/1971 | Young | |
| 3,622,907 A | 11/1971 | Tomlinson et al. | |
| 3,626,318 A | 12/1971 | Young | |
| 3,628,179 A | 12/1971 | Cuff | |
| 3,631,362 A | 12/1971 | Almasi et al. | |
| 3,646,469 A | 2/1972 | Buczek et al. | |
| 3,654,624 A * | 4/1972 | Becker et al. | 365/127 |
| 3,696,308 A | 10/1972 | Duffy et al. | |
| 3,735,282 A | 5/1973 | Gans | |
| 3,806,829 A * | 4/1974 | Duston et al. | 372/38.01 |
| 3,808,549 A | 4/1974 | Maurer | |
| 3,851,267 A | 11/1974 | Tanner | |
| 3,942,127 A | 3/1976 | Fluhr et al. | |

(Continued)

FOREIGN PATENT DOCUMENTS

EP 214100 A 3/1987

(Continued)

OTHER PUBLICATIONS

Stock et al., "Chirped Pulse Amplification in an Erbium-doped Diber Oscillator/Erbium-doped Fiber Amplifier System", Optics Communications, North-Holland Publishing Co., Amsterdam, NL, vol. 106, No. 4/5/06, Mar. 15, 1994, pp. 249-252, XP000429901, ISSN: 0030-4018.

(Continued)

*Primary Examiner* — Rexford Barnie
*Assistant Examiner* — Justen Fauth
(74) *Attorney, Agent, or Firm* — Carr & Ferrell LLP

(57) ABSTRACT

The present invention comprises, in various embodiments, systems and methods for shutting down a laser system in an intelligent and flexible manner. An intelligent laser interlock system includes both hardwired components, and intelligent components configured to execute computing instructions. The hardwired components and the intelligent components are configured to shutdown the laser system to one or more alternative shutdown states in response to one or more interlock signals.

10 Claims, 4 Drawing Sheets

U.S. PATENT DOCUMENTS

| | | | |
|---|---|---|---|
| 3,963,953 A | 6/1976 | Thornton, Jr. | |
| 4,061,427 A | 12/1977 | Fletcher et al. | |
| 4,194,813 A | 3/1980 | Benjamin et al. | |
| 4,289,378 A | 9/1981 | Remy et al. | |
| 4,389,617 A | 6/1983 | Kurnit | |
| 4,394,623 A | 7/1983 | Kurnit | |
| 4,590,598 A | 5/1986 | O'Harra, II | |
| 4,622,095 A | 11/1986 | Grobman et al. | |
| 4,655,547 A | 4/1987 | Heritage et al. | |
| 4,673,795 A * | 6/1987 | Ortiz, Jr. | 219/121.6 |
| 4,718,418 A | 1/1988 | L'Esperance, Jr. | |
| 4,722,591 A | 2/1988 | Haffner | |
| 4,730,113 A * | 3/1988 | Edwards et al. | 250/347 |
| 4,750,809 A | 6/1988 | Kafka et al. | |
| 4,808,000 A | 2/1989 | Pasciak | |
| 4,815,079 A | 3/1989 | Snitzer et al. | |
| 4,824,598 A | 4/1989 | Stokowski | |
| 4,827,125 A | 5/1989 | Goldstein | |
| 4,829,529 A | 5/1989 | Kafka | |
| 4,835,670 A * | 5/1989 | Adams et al. | 700/79 |
| 4,847,846 A | 7/1989 | Sone et al. | |
| 4,848,340 A | 7/1989 | Bille et al. | |
| 4,849,036 A | 7/1989 | Powell et al. | |
| 4,856,011 A * | 8/1989 | Shimada et al. | 372/29.01 |
| 4,902,127 A | 2/1990 | Byer et al. | |
| 4,907,586 A | 3/1990 | Bille et al. | |
| 4,913,520 A | 4/1990 | Kafka | |
| 4,915,757 A | 4/1990 | Rando | |
| 4,928,316 A | 5/1990 | Heritage et al. | |
| 4,947,398 A * | 8/1990 | Yasuda et al. | 372/29.021 |
| 4,950,268 A * | 8/1990 | Rink | 606/12 |
| 4,972,423 A | 11/1990 | Alfano et al. | |
| 4,983,034 A | 1/1991 | Spillman, Jr. | |
| 4,988,348 A | 1/1991 | Bille | |
| 4,994,059 A * | 2/1991 | Kosa et al. | 606/12 |
| 5,010,555 A | 4/1991 | Madey et al. | |
| 5,014,290 A | 5/1991 | Moore et al. | |
| 5,022,042 A | 6/1991 | Bradley | |
| 5,031,236 A | 7/1991 | Hodgkinson et al. | |
| 5,043,991 A | 8/1991 | Bradley | |
| 5,053,171 A | 10/1991 | Portney et al. | |
| 5,095,487 A | 3/1992 | Meyerhofer et al. | |
| 5,098,426 A | 3/1992 | Sklar et al. | |
| 5,122,439 A | 6/1992 | Miersch et al. | |
| 5,132,996 A | 7/1992 | Moore et al. | |
| 5,146,088 A | 9/1992 | Kingham et al. | |
| 5,154,707 A * | 10/1992 | Rink et al. | 606/12 |
| 5,159,402 A * | 10/1992 | Ortiz, Jr. | 356/237.1 |
| 5,162,643 A | 11/1992 | Currie | |
| 5,166,818 A | 11/1992 | Chase et al. | |
| 5,187,759 A | 2/1993 | DiGiovanni et al. | |
| 5,204,867 A * | 4/1993 | Koschmann | 372/33 |
| 5,206,455 A * | 4/1993 | Williams et al. | 102/201 |
| 5,237,576 A | 8/1993 | DiGiovanni et al. | |
| 5,255,117 A * | 10/1993 | Cushman | 359/234 |
| 5,265,107 A | 11/1993 | Delfyett, Jr. | |
| 5,267,077 A | 11/1993 | Blonder | |
| 5,278,853 A | 1/1994 | Shirai et al. | |
| 5,291,501 A | 3/1994 | Hanna | |
| 5,293,186 A | 3/1994 | Seden et al. | |
| 5,301,347 A * | 4/1994 | Kensky | 700/267 |
| 5,302,835 A | 4/1994 | Bendett et al. | |
| 5,309,453 A | 5/1994 | Treacy | |
| 5,313,262 A | 5/1994 | Leonard | |
| 5,315,431 A | 5/1994 | Masuda et al. | |
| 5,315,436 A | 5/1994 | Lowenhar et al. | |
| 5,329,398 A | 7/1994 | Lai et al. | |
| 5,331,131 A | 7/1994 | Opdyke | |
| 5,355,383 A * | 10/1994 | Lockard | 372/38.03 |
| 5,367,143 A | 11/1994 | White, Jr. | |
| 5,400,350 A | 3/1995 | Galvanauskas | |
| 5,411,918 A | 5/1995 | Keible et al. | |
| 5,414,725 A | 5/1995 | Fermann et al. | |
| 5,418,809 A | 5/1995 | August, Jr. et al. | |
| 5,428,471 A * | 6/1995 | McDermott | 398/181 |
| 5,430,572 A | 7/1995 | DiGiovanni et al. | |
| 5,440,573 A | 8/1995 | Fermann | |
| 5,446,813 A | 8/1995 | Lee et al. | |
| 5,450,427 A | 9/1995 | Fermann et al. | |
| 5,479,422 A | 12/1995 | Fermann et al. | |
| 5,489,984 A | 2/1996 | Hariharan et al. | |
| 5,499,134 A | 3/1996 | Galvanauskas et al. | |
| 5,517,043 A | 5/1996 | Ma et al. | |
| 5,520,679 A | 5/1996 | Lin | |
| 5,548,098 A | 8/1996 | Sugawara et al. | |
| 5,572,335 A | 11/1996 | Stevens | |
| 5,572,358 A | 11/1996 | Gabl et al. | |
| 5,585,642 A * | 12/1996 | Britton et al. | 250/492.3 |
| 5,585,652 A | 12/1996 | Kamasz et al. | |
| 5,585,913 A | 12/1996 | Hariharan et al. | |
| 5,590,142 A | 12/1996 | Shan | |
| 5,592,327 A | 1/1997 | Gabl et al. | |
| 5,596,668 A | 1/1997 | DiGiovanni et al. | |
| 5,602,673 A | 2/1997 | Swan | |
| 5,602,677 A | 2/1997 | Tournois | |
| 5,615,043 A | 3/1997 | Plaessmann et al. | |
| 5,617,434 A | 4/1997 | Tamura et al. | |
| 5,624,587 A | 4/1997 | Otsuki et al. | |
| 5,625,544 A | 4/1997 | Kowshik et al. | |
| 5,627,848 A | 5/1997 | Fermann et al. | |
| 5,631,771 A | 5/1997 | Swan | |
| 5,633,750 A | 5/1997 | Nogiwa et al. | |
| 5,633,885 A | 5/1997 | Galvanauskas et al. | |
| 5,642,447 A | 6/1997 | Pan et al. | |
| 5,644,424 A | 7/1997 | Backus et al. | |
| 5,651,018 A | 7/1997 | Mehuys et al. | |
| 5,656,186 A | 8/1997 | Mourou et al. | |
| 5,657,153 A | 8/1997 | Endriz et al. | |
| 5,661,829 A | 8/1997 | Zheng | |
| 5,663,731 A | 9/1997 | Theodoras, II et al. | |
| 5,665,942 A * | 9/1997 | Williams et al. | 178/19.01 |
| 5,666,722 A | 9/1997 | Tamm et al. | |
| 5,670,067 A * | 9/1997 | Koide et al. | 219/121.68 |
| 5,677,769 A | 10/1997 | Bendett | |
| 5,689,361 A | 11/1997 | Damen et al. | |
| 5,689,519 A | 11/1997 | Fermann et al. | |
| 5,694,501 A | 12/1997 | Alavie et al. | |
| 5,696,782 A | 12/1997 | Harter et al. | |
| 5,701,319 A | 12/1997 | Fermann | |
| 5,703,639 A | 12/1997 | Farrier et al. | |
| 5,708,669 A | 1/1998 | DiGiovanni et al. | |
| 5,710,424 A | 1/1998 | Theodoras, II et al. | |
| 5,720,894 A | 2/1998 | Neev et al. | |
| 5,726,855 A | 3/1998 | Mourou et al. | |
| 5,734,762 A | 3/1998 | Ho et al. | |
| 5,736,709 A | 4/1998 | Neiheisel | |
| 5,739,933 A | 4/1998 | Dembeck et al. | |
| 5,770,864 A | 6/1998 | Dlugos | |
| 5,771,253 A | 6/1998 | Chang-Hasnain et al. | |
| 5,778,016 A | 7/1998 | Sucha et al. | |
| 5,781,289 A | 7/1998 | Sabsabi et al. | |
| 5,788,688 A | 8/1998 | Bauer et al. | |
| 5,790,574 A | 8/1998 | Rieger et al. | |
| 5,815,519 A | 9/1998 | Aoshima et al. | |
| 5,818,630 A | 10/1998 | Fermann et al. | |
| 5,822,097 A | 10/1998 | Tournois | |
| 5,844,149 A | 12/1998 | Akiyoshi et al. | |
| 5,847,825 A | 12/1998 | Alexander | |
| 5,847,863 A | 12/1998 | Galvanauskas et al. | |
| 5,862,287 A | 1/1999 | Stock et al. | |
| 5,862,845 A | 1/1999 | Chin et al. | |
| 5,867,304 A | 2/1999 | Galvanauskas et al. | |
| 5,875,408 A | 2/1999 | Bendett et al. | |
| 5,880,823 A | 3/1999 | Lu | |
| 5,880,877 A | 3/1999 | Fermann et al. | |
| 5,898,485 A | 4/1999 | Nati, Jr. | |
| 5,907,157 A | 5/1999 | Yoshioka et al. | |
| 5,920,668 A | 7/1999 | Uehara et al. | |
| 5,923,686 A | 7/1999 | Fermann et al. | |
| 5,929,430 A | 7/1999 | Yao et al. | |
| 5,936,716 A | 8/1999 | Pinsukanjana et al. | |
| 5,999,847 A | 12/1999 | Elstrom | |
| 6,014,249 A | 1/2000 | Fermann et al. | |
| 6,016,452 A * | 1/2000 | Kasevich | 607/101 |
| 6,020,591 A | 2/2000 | Harter et al. | |
| 6,034,975 A | 3/2000 | Harter et al. | |
| 6,041,020 A | 3/2000 | Caron et al. | |

| | | |
|---|---|---|
| 6,061,373 A | 5/2000 | Brockman et al. |
| 6,071,276 A | 6/2000 | Abela |
| 6,072,811 A | 6/2000 | Fermann et al. |
| 6,075,588 A | 6/2000 | Pinsukanjana et al. |
| 6,081,369 A | 6/2000 | Waarts et al. |
| 6,088,153 A | 7/2000 | Anthon et al. |
| 6,099,522 A | 8/2000 | Knopp et al. |
| 6,120,857 A | 9/2000 | Balooch et al. |
| 6,122,097 A | 9/2000 | Weston et al. |
| 6,130,780 A | 10/2000 | Joannopoulos et al. |
| 6,134,003 A | 10/2000 | Tearney et al. |
| 6,141,140 A | 10/2000 | Kim |
| 6,151,338 A | 11/2000 | Grubb et al. |
| 6,154,310 A | 11/2000 | Galvanauskas et al. |
| 6,156,030 A | 12/2000 | Neev |
| 6,161,543 A | 12/2000 | Cox et al. |
| 6,168,590 B1 | 1/2001 | Neev |
| 6,172,611 B1 * | 1/2001 | Hussain et al. ............ 340/584 |
| 6,175,437 B1 | 1/2001 | Diels et al. |
| 6,179,421 B1 * | 1/2001 | Pang ............................ 351/205 |
| 6,181,463 B1 | 1/2001 | Galvanauskas et al. |
| 6,190,380 B1 | 2/2001 | Abela |
| 6,198,568 B1 | 3/2001 | Galvanauskas et al. |
| 6,198,766 B1 | 3/2001 | Schuppe et al. |
| 6,201,914 B1 | 3/2001 | Duguay et al. |
| 6,208,458 B1 | 3/2001 | Galvanauskas et al. |
| 6,246,816 B1 | 6/2001 | Moore et al. |
| 6,249,630 B1 | 6/2001 | Stock et al. |
| 6,252,892 B1 | 6/2001 | Jiang et al. |
| 6,256,328 B1 | 7/2001 | Delfyett et al. |
| 6,269,108 B1 | 7/2001 | Tabirian et al. |
| 6,271,650 B1 | 8/2001 | Massie et al. |
| 6,275,250 B1 | 8/2001 | Sanders et al. |
| 6,275,512 B1 | 8/2001 | Fermann |
| 6,281,471 B1 | 8/2001 | Smart |
| 6,290,910 B1 | 9/2001 | Chalk |
| 6,303,903 B1 | 10/2001 | Liu |
| 6,314,115 B1 | 11/2001 | Delfyett et al. |
| 6,325,792 B1 | 12/2001 | Swinger et al. |
| 6,327,074 B1 | 12/2001 | Bass et al. |
| 6,327,282 B2 | 12/2001 | Hammons et al. |
| 6,330,383 B1 | 12/2001 | Cai et al. |
| 6,334,011 B1 | 12/2001 | Galvanauskas et al. |
| 6,335,821 B1 | 1/2002 | Suzuki et al. |
| 6,340,806 B1 | 1/2002 | Smart et al. |
| RE37,585 E | 3/2002 | Mourou et al. |
| 6,355,908 B1 | 3/2002 | Tatah et al. |
| 6,359,681 B1 * | 3/2002 | Housand et al. ............ 356/4.01 |
| 6,362,454 B1 | 3/2002 | Liu |
| 6,365,869 B1 | 4/2002 | Swain et al. |
| 6,366,395 B1 | 4/2002 | Drake et al. |
| 6,370,171 B1 | 4/2002 | Horn et al. |
| 6,370,422 B1 | 4/2002 | Richards-Kortum et al. |
| 6,396,317 B1 | 5/2002 | Roller et al. |
| 6,404,944 B1 | 6/2002 | Wa et al. |
| 6,407,363 B2 | 6/2002 | Dunsky et al. |
| 6,418,256 B1 | 7/2002 | Danziger et al. |
| 6,421,169 B1 | 7/2002 | Bonnedal et al. |
| 6,433,303 B1 | 8/2002 | Liu et al. |
| 6,433,305 B1 | 8/2002 | Liu et al. |
| 6,433,760 B1 | 8/2002 | Vaissie et al. |
| 6,463,314 B1 | 10/2002 | Haruna |
| 6,482,199 B1 | 11/2002 | Neev |
| 6,485,413 B1 | 11/2002 | Boppart et al. |
| 6,486,435 B1 | 11/2002 | Beyer et al. |
| 6,501,590 B2 | 12/2002 | Bass et al. |
| 6,522,460 B2 | 2/2003 | Bonnedal et al. |
| 6,522,674 B1 | 2/2003 | Niwano et al. |
| 6,525,873 B2 | 2/2003 | Gerrish et al. |
| 6,526,085 B2 * | 2/2003 | Vogler et al. .................... 372/58 |
| 6,526,327 B2 | 2/2003 | Kar et al. |
| 6,529,319 B2 | 3/2003 | Youn et al. |
| 6,541,731 B2 | 4/2003 | Mead et al. |
| 6,547,453 B1 * | 4/2003 | Stummer et al. ............... 385/88 |
| 6,549,547 B2 | 4/2003 | Galvanauskas et al. |
| 6,552,301 B2 | 4/2003 | Herman et al. |
| 6,555,781 B2 | 4/2003 | Ngoi et al. |
| 6,556,733 B2 | 4/2003 | Dy et al. |
| 6,567,431 B2 | 5/2003 | Tabirian et al. |
| 6,573,813 B1 | 6/2003 | Joannopoulos et al. |
| 6,574,024 B1 | 6/2003 | Liu |
| 6,574,250 B2 | 6/2003 | Sun et al. |
| 6,576,917 B1 | 6/2003 | Silfvast |
| 6,580,553 B2 | 6/2003 | Kim et al. |
| 6,587,488 B1 | 7/2003 | Meissner et al. |
| 6,597,497 B2 | 7/2003 | Wang et al. |
| 6,603,903 B1 | 8/2003 | Tong et al. |
| 6,603,911 B2 | 8/2003 | Fink et al. |
| 6,621,040 B1 | 9/2003 | Perry et al. |
| 6,621,045 B1 | 9/2003 | Liu et al. |
| 6,627,421 B1 | 9/2003 | Unger et al. |
| 6,627,844 B2 | 9/2003 | Liu et al. |
| 6,642,477 B1 | 11/2003 | Patel et al. |
| 6,647,031 B2 | 11/2003 | Delfyett et al. |
| 6,654,161 B2 | 11/2003 | Bass et al. |
| 6,661,816 B2 | 12/2003 | Delfyett et al. |
| 6,661,820 B1 * | 12/2003 | Camilleri et al. .......... 372/38.09 |
| 6,671,298 B1 | 12/2003 | Delfyett et al. |
| 6,677,552 B1 | 1/2004 | Tulloch et al. |
| 6,681,079 B1 * | 1/2004 | Maroney ........................ 398/15 |
| 6,690,686 B2 | 2/2004 | Delfyett et al. |
| 6,695,835 B2 | 2/2004 | Furuno et al. |
| 6,696,008 B2 | 2/2004 | Brandinger |
| 6,697,402 B2 | 2/2004 | Crawford |
| 6,697,408 B2 * | 2/2004 | Kennedy et al. ................. 372/55 |
| 6,700,094 B1 | 3/2004 | Kuntze |
| 6,700,698 B1 | 3/2004 | Scott |
| 6,706,036 B2 | 3/2004 | Lai |
| 6,706,998 B2 | 3/2004 | Cutler |
| 6,710,288 B2 | 3/2004 | Liu et al. |
| 6,710,293 B2 | 3/2004 | Liu et al. |
| 6,711,334 B2 | 3/2004 | Szkopek et al. |
| 6,716,475 B1 | 4/2004 | Fink et al. |
| 6,720,519 B2 | 4/2004 | Liu et al. |
| 6,723,991 B1 | 4/2004 | Sucha et al. |
| 6,727,458 B2 | 4/2004 | Smart |
| 6,728,273 B2 | 4/2004 | Perry |
| 6,728,439 B2 | 4/2004 | Weisberg et al. |
| 6,735,229 B1 | 5/2004 | Delfyett et al. |
| 6,735,368 B2 | 5/2004 | Parker et al. |
| 6,738,144 B1 | 5/2004 | Dogariu |
| 6,738,408 B2 | 5/2004 | Abedin |
| 6,744,555 B2 | 6/2004 | Galvanauskas et al. |
| 6,747,795 B2 | 6/2004 | Lin et al. |
| 6,749,285 B2 | 6/2004 | Liu et al. |
| 6,760,356 B2 | 7/2004 | Erbert et al. |
| 6,774,869 B2 | 8/2004 | Biocca et al. |
| 6,785,445 B2 | 8/2004 | Kuroda et al. |
| 6,787,733 B2 | 9/2004 | Lubatschowski et al. |
| 6,787,734 B2 | 9/2004 | Liu |
| 6,788,864 B2 | 9/2004 | Ahmad et al. |
| 6,791,060 B2 | 9/2004 | Dunsky et al. |
| 6,791,071 B2 | 9/2004 | Woo et al. |
| 6,795,461 B1 | 9/2004 | Blair et al. |
| 6,801,550 B1 | 10/2004 | Snell et al. |
| 6,801,551 B1 | 10/2004 | Delfyett et al. |
| 6,801,557 B2 | 10/2004 | Liu |
| 6,803,539 B2 | 10/2004 | Liu et al. |
| 6,804,574 B2 | 10/2004 | Liu et al. |
| 6,807,353 B1 | 10/2004 | Fleming et al. |
| 6,807,375 B2 | 10/2004 | Dogariu |
| 6,815,638 B2 | 11/2004 | Liu |
| 6,819,694 B2 | 11/2004 | Jiang et al. |
| 6,819,702 B2 | 11/2004 | Sverdlov et al. |
| 6,819,837 B2 | 11/2004 | Li et al. |
| 6,822,251 B1 | 11/2004 | Arenberg et al. |
| 6,824,540 B1 | 11/2004 | Lin |
| 6,829,517 B2 | 12/2004 | Cheng et al. |
| 6,834,134 B2 | 12/2004 | Brennan, III et al. |
| 6,878,900 B2 | 4/2005 | Corkum et al. |
| 6,882,772 B1 | 4/2005 | Lowery et al. |
| 6,885,683 B1 | 4/2005 | Fermann et al. |
| 6,887,804 B2 | 5/2005 | Sun et al. |
| 6,897,405 B2 | 5/2005 | Cheng et al. |
| 6,902,561 B2 | 6/2005 | Kurtz et al. |
| 6,917,631 B2 | 7/2005 | Richardson et al. |
| 6,928,490 B1 | 8/2005 | Bucholz et al. |
| 6,937,629 B2 | 8/2005 | Perry et al. |

| | | |
|---|---|---|
| 6,943,359 B2 | 9/2005 | Vardeny et al. |
| 6,956,680 B2 | 10/2005 | Morbieu et al. |
| 7,006,730 B2 | 2/2006 | Doerr |
| 7,022,119 B2 | 4/2006 | Hohla |
| 7,031,571 B2 | 4/2006 | Mihailov et al. |
| 7,068,408 B2 * | 6/2006 | Sakai ................. 359/212.2 |
| 7,072,101 B2 | 7/2006 | Kapteyn et al. |
| 7,088,756 B2 | 8/2006 | Fermann et al. |
| 7,095,772 B1 | 8/2006 | Delfyett et al. |
| 7,099,549 B2 | 8/2006 | Scheuer et al. |
| 7,116,688 B2 | 10/2006 | Sauter et al. |
| 7,132,289 B2 | 11/2006 | Kobayashi et al. |
| 7,143,769 B2 | 12/2006 | Stoltz et al. |
| 7,171,074 B2 | 1/2007 | DiGiovanni et al. |
| 7,217,266 B2 | 5/2007 | Anderson et al. |
| 7,220,255 B2 | 5/2007 | Lai |
| 7,233,607 B2 | 6/2007 | Richardson et al. |
| 7,257,302 B2 | 8/2007 | Fermann et al. |
| 7,321,605 B2 | 1/2008 | Albert |
| 7,321,713 B2 | 1/2008 | Akiyama et al. |
| 7,332,234 B2 | 2/2008 | Levinson et al. |
| 7,349,452 B2 | 3/2008 | Brennan, III et al. |
| 7,361,171 B2 | 4/2008 | Stoltz et al. |
| 7,367,969 B2 | 5/2008 | Stoltz et al. |
| 7,444,049 B1 | 10/2008 | Kim et al. |
| 7,505,196 B2 * | 3/2009 | Nati et al. ................. 359/333 |
| 7,518,788 B2 | 4/2009 | Fermann et al. |
| 7,584,756 B2 | 9/2009 | Zadoyan et al. |
| 7,728,967 B2 * | 6/2010 | Ochiai et al. ............. 356/237.2 |
| 7,787,175 B1 | 8/2010 | Brennan, III et al. |
| 7,822,347 B1 | 10/2010 | Brennan, III et al. |
| 2001/0009250 A1 | 7/2001 | Herman et al. |
| 2001/0021294 A1 | 9/2001 | Cai et al. |
| 2001/0046243 A1 * | 11/2001 | Schie ................. 372/38.02 |
| 2002/0003130 A1 | 1/2002 | Sun et al. |
| 2002/0051606 A1 | 5/2002 | Takushima et al. |
| 2002/0071454 A1 | 6/2002 | Lin |
| 2002/0091325 A1 | 7/2002 | Ostrovsky |
| 2002/0095142 A1 | 7/2002 | Ming |
| 2002/0097468 A1 | 7/2002 | Mecherle et al. |
| 2002/0097761 A1 | 7/2002 | Sucha et al. |
| 2002/0153500 A1 | 10/2002 | Fordahl et al. |
| 2002/0167581 A1 | 11/2002 | Cordingley et al. |
| 2002/0167974 A1 * | 11/2002 | Kennedy et al. ............ 372/10 |
| 2002/0176676 A1 | 11/2002 | Johnson et al. |
| 2002/0186915 A1 | 12/2002 | Yu et al. |
| 2002/0191901 A1 * | 12/2002 | Jensen ................. 385/24 |
| 2003/0011782 A1 | 1/2003 | Tanno |
| 2003/0031410 A1 | 2/2003 | Schnitzer |
| 2003/0039442 A1 | 2/2003 | Bond et al. |
| 2003/0053508 A1 | 3/2003 | Dane et al. |
| 2003/0055413 A1 | 3/2003 | Altshuler et al. |
| 2003/0060808 A1 | 3/2003 | Wilk |
| 2003/0086647 A1 | 5/2003 | Willner et al. |
| 2003/0095266 A1 | 5/2003 | Detalle et al. |
| 2003/0123496 A1 * | 7/2003 | Broutin et al. ............. 372/20 |
| 2003/0142705 A1 | 7/2003 | Hackel et al. |
| 2003/0156605 A1 | 8/2003 | Richardson et al. |
| 2003/0161365 A1 | 8/2003 | Perry et al. |
| 2003/0161378 A1 | 8/2003 | Zhang et al. |
| 2003/0178396 A1 | 9/2003 | Naumov et al. |
| 2003/0202547 A1 | 10/2003 | Fermann et al. |
| 2003/0205561 A1 | 11/2003 | Iso |
| 2003/0214714 A1 | 11/2003 | Zheng |
| 2003/0223689 A1 | 12/2003 | Koch et al. |
| 2003/0235381 A1 * | 12/2003 | Hunt ................. 385/122 |
| 2004/0000942 A1 | 1/2004 | Kapteyn et al. |
| 2004/0037505 A1 | 2/2004 | Morin |
| 2004/0042061 A1 | 3/2004 | Islam et al. |
| 2004/0049552 A1 | 3/2004 | Motoyama et al. |
| 2004/0101001 A1 | 5/2004 | Bergmann et al. |
| 2004/0128081 A1 | 7/2004 | Rabitz et al. |
| 2004/0134894 A1 | 7/2004 | Gu et al. |
| 2004/0134896 A1 | 7/2004 | Gu et al. |
| 2004/0226925 A1 | 11/2004 | Gu et al. |
| 2004/0231682 A1 | 11/2004 | Stoltz et al. |
| 2004/0233944 A1 | 11/2004 | Dantus et al. |
| 2004/0263950 A1 | 12/2004 | Fermann et al. |
| 2005/0008044 A1 | 1/2005 | Fermann et al. |
| 2005/0018986 A1 | 1/2005 | Argyros et al. |
| 2005/0035097 A1 | 2/2005 | Stoltz |
| 2005/0036527 A1 | 2/2005 | Khazaei et al. |
| 2005/0038487 A1 | 2/2005 | Stoltz |
| 2005/0061779 A1 | 3/2005 | Blumenfeld et al. |
| 2005/0065502 A1 | 3/2005 | Stoltz |
| 2005/0067388 A1 | 3/2005 | Sun et al. |
| 2005/0074974 A1 | 4/2005 | Stoltz |
| 2005/0077275 A1 | 4/2005 | Stoltz |
| 2005/0105865 A1 | 5/2005 | Fermann et al. |
| 2005/0107773 A1 | 5/2005 | Bergt et al. |
| 2005/0111073 A1 | 5/2005 | Pan et al. |
| 2005/0111500 A1 | 5/2005 | Harter et al. |
| 2005/0127049 A1 | 6/2005 | Woeste et al. |
| 2005/0154380 A1 | 7/2005 | DeBenedictis et al. |
| 2005/0163426 A1 | 7/2005 | Fermann et al. |
| 2005/0167405 A1 | 8/2005 | Stoltz et al. |
| 2005/0171516 A1 | 8/2005 | Stoltz et al. |
| 2005/0171518 A1 | 8/2005 | Stoltz et al. |
| 2005/0175280 A1 | 8/2005 | Nicholson |
| 2005/0177143 A1 | 8/2005 | Bullington et al. |
| 2005/0195726 A1 | 9/2005 | Bullington et al. |
| 2005/0213630 A1 | 9/2005 | Mielke et al. |
| 2005/0215985 A1 | 9/2005 | Mielke et al. |
| 2005/0218122 A1 | 10/2005 | Yamamoto et al. |
| 2005/0225846 A1 * | 10/2005 | Nati et al. ................. 359/341.1 |
| 2005/0226278 A1 | 10/2005 | Gu et al. |
| 2005/0226286 A1 | 10/2005 | Liu et al. |
| 2005/0226287 A1 | 10/2005 | Shah et al. |
| 2005/0232560 A1 | 10/2005 | Knight et al. |
| 2005/0238070 A1 | 10/2005 | Imeshev et al. |
| 2005/0253482 A1 * | 11/2005 | Kapps et al. ................. 310/319 |
| 2005/0259944 A1 | 11/2005 | Anderson et al. |
| 2005/0265407 A1 | 12/2005 | Braun et al. |
| 2005/0271094 A1 | 12/2005 | Miller et al. |
| 2005/0271340 A1 | 12/2005 | Weisberg et al. |
| 2006/0016891 A1 * | 1/2006 | Giebel et al. ................. 235/454 |
| 2006/0030951 A1 * | 2/2006 | Davlin et al. ................. 700/3 |
| 2006/0050750 A1 | 3/2006 | Barty |
| 2006/0056480 A1 | 3/2006 | Mielke et al. |
| 2006/0064079 A1 | 3/2006 | Stoltz et al. |
| 2006/0067604 A1 | 3/2006 | Bull et al. |
| 2006/0084957 A1 | 4/2006 | Delfyett et al. |
| 2006/0093012 A1 | 5/2006 | Singh et al. |
| 2006/0093265 A1 | 5/2006 | Jia et al. |
| 2006/0120418 A1 | 6/2006 | Harter et al. |
| 2006/0126679 A1 | 6/2006 | Brennan, III et al. |
| 2006/0131288 A1 | 6/2006 | Sun et al. |
| 2006/0187974 A1 | 8/2006 | Dantus |
| 2006/0209908 A1 | 9/2006 | Pedersen et al. |
| 2006/0210275 A1 | 9/2006 | Vaissie et al. |
| 2006/0221449 A1 | 10/2006 | Glebov et al. |
| 2006/0250025 A1 * | 11/2006 | Kitagawa et al. ............ 307/118 |
| 2006/0268949 A1 | 11/2006 | Gohle et al. |
| 2007/0025728 A1 | 2/2007 | Nakazawa et al. |
| 2007/0047965 A1 | 3/2007 | Liu et al. |
| 2007/0064304 A1 | 3/2007 | Brennan, III |
| 2007/0106416 A1 | 5/2007 | Griffiths et al. |
| 2007/0196048 A1 | 8/2007 | Galvanauskas et al. |
| 2007/0229939 A1 | 10/2007 | Brown et al. |
| 2007/0253455 A1 | 11/2007 | Stadler et al. |
| 2007/0273960 A1 | 11/2007 | Fermann et al. |
| 2008/0232407 A1 | 9/2008 | Harter et al. |
| 2009/0245302 A1 | 10/2009 | Baird et al. |
| 2009/0273828 A1 | 11/2009 | Waarts et al. |
| 2009/0297155 A1 | 12/2009 | Weiner et al. |
| 2010/0118899 A1 | 5/2010 | Peng et al. |

FOREIGN PATENT DOCUMENTS

| | | |
|---|---|---|
| EP | 691563 A2 | 1/1996 |
| EP | 1462831 A1 | 9/2004 |
| JP | 8171103 | 7/1996 |
| JP | 11189472 A | 7/1999 |
| JP | 2003181661 A | 7/2003 |
| JP | 2003344883 | 12/2003 |
| JP | 2005174993 | 6/2005 |
| WO | WO9428972 A1 | 12/1994 |
| WO | WO2004105100 A2 | 12/2004 |
| WO | WO2004114473 A2 | 12/2004 |

| | | | |
|---|---|---|---|
| WO | WO2005018060 A2 | 2/2005 | |
| WO | WO2005018061 A2 | 2/2005 | |
| WO | WO2005018062 A2 | 2/2005 | |
| WO | WO2005018063 A2 | 2/2005 | |

OTHER PUBLICATIONS

Strickland et al., "Compression of Amplified Chirped Optical Pulses", Optics Communications, North-Holland Publishing Co., Amersterdam, NL, vol. 56, No. 3, Dec. 1, 1985, pp. 219-221, XP024444933 ISSN: 0030-4018 (retrieved on Dec. 11, 1985.
Temelkuran, B. et al., "Wavelength-scalable Hollow Optical Fibres with Large Photonic Bandgaps for CO2 Laser Transmission," Nature, Dec. 12, 2002, pp. 650-653.
Thurston, R.N. et al., "Analysis of Picosecond Pulse Shape Synthesis by Spectral Masking in a Grating Pulse Compressor," IEEE Journal of Quantum Electronics, vol. EQ-22, No. 5, pp. 682-696, May 1986.
Weiner, A.M. et al., "Synthesis of Phase-coherent, Picosecond Optical Square Pulses," Optics Letters, vol. 11, No. 3, pp. 153-155, Mar. 1986.
Weiner, A.M., "Femtosecond Optical Pulse Shaping and Processing," Prog. Quant. Electr. 1995, vol. 19, pp. 161-237, 1995.
Weiner, A.M., "High-resolution femtosecond Pulse Shaping," Journal of the Optical Society of America B. vol. 5, No. 8, pp. 1563-1572, Aug. 1988.
Wells, D.J., "Gene Therapy Progress and Prospects: electroporation and Other Physical Methods," Gene Therapy, Nature Publishing Group, vol. 11, pp. 1363-1369, Aug. 5, 2004, (http://www.nature.com/gt).
White, W.E., et al., "Compensation of Higher-order Frequency-dependent Phase Terms in Chirped-pulse Amplification Systems," Optics Letters, vol. 18, No. 16, pp. 1343-1345, Aug. 15, 1993.
Yamakawa et al., "1 Hz, 1 ps, terawatt Nd: glass laser", Optics Communications, North-Holland Publishing Co. Amsterdam, NL, vol. 112, No. 1-2, Nov. 1, 1994, pp. 37-42, XP024424285.
Yan et al., Ultrashort Pulse Measurement Using Interferometric Autocorrelator Based on Two-photon-absorbtion Detector at 1.55μm Wavelength Region., 2005, Proceedings of SPIE vol. 5633, Advanced Materials and Devices for Sensing and Imaging II, pp. 424-429.
Yeh, et al. "Theory of Bragg Fiber", Journal of the Optical Society America, Sep. 1978, pp. 1196, vol. 68, No. 9., pp. 1196-1201.
Yi, Y. et al., "Sharp Bending of On-Chip silicon Bragg Cladding Waveguide With Light Guiding on Low Index Core Materials", IEEE Journal of Selected Topics in Quantum Electronics, vol. 12, No. 6, Nov./Dec. 2006, pp. 1345-1348.
Yi, Y., et al., "On-chip Si-based Bragg Cladding Waveguide with High Index Contrast Bilayers", Optics Express, vol. 12, No. 20, Oct. 4, 2004, pp. 4775-4780.
Yin, D. et al., "Integrated ARROW Waveguides with Hollow Cores", Optics Express, vol. 12, No. 12, Jun. 14, 2004, pp. 2710-2715.
Zhou, S. et al., "Compensation of nonlinear Phase Shifts with Third-order Dispersion in Short-pulse Fiber Amplifiers," Optics Express, vol. 13, No. 13, pp. 4869-2877, Jun. 27, 2005.
Agostinelli, J. et al., "Optical Pulse Shaping with a Grating Pair," Applied Optics, vol. 18, No. 14, pp. 2500-2504, Jul. 15, 1979.
Anastassiou et al., "Photonic Bandgap Fibers Exploiting Omnidirectional Reflectivity Enable Flexible Delivery of Infrared Lasers for Tissue Cutting," Proceedings of the SPIE—the International Society for Optical Engineering, SPIE, US, vol. 5317, No. 1, Jan. 1, 2004, pp. 29-38, XP002425586 ISSN: 0277-786X.
Benoit, G. et al., "Dynamic All-optical Tuning of Transverse Resonant Cavity Modes in Photonic Bandgap Fibers,"Optics Letters, vol. 30, No. 13, Jul. 1, 2005, pp. 1620-1622.
Chen, L. et al., "Ultrashort Optical Pulse Interaction with Fibre Gratings and Device Applications," 1997, Canaga, located at http://www.collectionscanada.ca/obj/s4/f2/dsk2/ftp04/mq29402.pfd.
Chen, X. et al., "Highly Birefringent Hollow-core Photonic Bandgap Fiber," Optics Express, vol. 12, No. 16, Aug. 9, 2004, pp. 3888-3893.
Chen, Y. et al., "Dispersion-Managed Mode Locking", Journal of the Optical Society of America B, Nov. 1999, pp. 1999-2004, vol. 16, No. 11, Optical Society of America.
Dasgupta, S. et al., "Design of Dispersion-Compensating Bragg Fiber with an Ultrahigh Figure of Merit," Optics Letters, Aug. 1, 2005, vol. 30, No. 15, Optical Society of America.
De Matos et al., "Multi-kilowatt, Picosecond Pulses from an All-fiber Chirped Pulse Amplification System Using Air-core Photonic Bandgalp Fiber", Lasers and Electro-optics, 2004, (CLEO), Conference on San Francisco, CA USA, May 20-21, 2004, Piscataway, NJ, USA, IEEE, vol. May 17, 2004, pp. 973-974, XP010745448 ISBN: 978-1-55752-777-6.
De Matos, C.J.S. et al., "All-fiber Chirped Pulse Amplification using Highly-dispersive Air-core Photonic Bandgap Fiber," Nov. 3, 2003, Optics Express, pp. 2832-2837, vol. 11, No. 22.
Delfyett, P. et al., "Ultrafast Semiconductor Laser-Diode-Seeded Cr:LiSAF Rengerative Amplifier System", Applied Optics, May 20, 1997, pp. 3375-3380, vol. 36, No. 15, Octoical Society of America.
Eggleton, et al., "Electrically Tunable Power Efficient Dispersion Compensating Fiber Bragg Grating," IEEE Photonics Technology Letters, vol. 11, No. 7, pp. 854-856, Jul. 1999.
Engeness et al., "Dispersion Tailoring and Compensation by Modal Interations in Omniguide Fibers," Optics Express, May 19, 2003, pp. 1175-1196, vol. 11, No. 10.
Fink et al., "Guiding Optical Light in Air Using an All-Dielectric Structure," Journal of Lightwave Technology, Nov. 1999, pp. 2039-2041, vol. 17, No. 11.
Folkenberg, J.R., et al., "Broadband Single-polarization Photonic Crystal Fiber," Optics Letters, vol. 30, No. 12, Jun. 15, 2005, pp. 1446-1448.
Folkenberg, J.R., et al., "Polarization Maintaining Large Mode Area Photonic Crystal Fiber," Optics Express vol. 12, No. 5, Mar. 8, 2004, pp. 956-960.
Futami, F., et al., "Wideband Fibre Dispersion Equalisation up to Fourth-order for Long-distance Sub-picosecond Optical Pulse Transmission," Electronics Letters, vol. 35, No. 25, Dec. 9, 1999.
Galvanauskas, A. et al., "Chirped-pulse-amplification Circuits for Fiber Amplifiers, Based on Chirped-period Quasi-phase, matching gratings", Optics Letters, Nov. 1, 1998, p. 1695-1697, vol. 23, No. 21, Optical Society of America.
Hartl et al., "In-line high energy Yb Fiber Laser Based Chirped Pulse Amplifier System", Laser and Electro-Optics, 2004, (CLEO) Conference of San Francisco, CA USA May 20-21, 2004, Piscataway, NJ, USA, IEEE, vol. 1, May 17, 2004, pp. 563-565, XP010745382, ISBN: 978-1-55752-7777-.
Hellstrom, E. et al., "Third-order Dispersion Compensation Using a Phase Modulator", Journal of Lightwave Technology, vol. 21, No. 5, pp. 1188-1197, May 2003.
Heritage, J. P. et al., "Picosecond Pulse Shaping by Spectral Phase and Amplitude Manipulation," Optics Letters, vol. 10, No. 12, pp. 609-611, Dec. 1985.
Heritage, J.P. et al., "Spectral Windowing of Frequency-Modulated Optical Pulses in a Grating Compressor," Applied Physics Letters, vol. 47, No. 2, pp. 87-89, Jul. 15, 1985.
Hill, K. et al., "Fiber Bragg Grating Technology Fundamentals and Overview," Journal of Lightwave Technology, Aug. 1997, vol. 15, No. 8, pp. 1263-1276.
Ibanescu et al., "Analysis of Mode Structure in Hollow Dielctric Waveguide Fibers,"Physical Review E 67, 2003, The American Physical Society.
Jiang, et al., "Fully Dispersion Compensated ~500 fs Pulse Transmission Over 50 km Single Mode Fiber," Optics Letters, vol. 30, No. 12, pp. 1449-1451, Jun. 15, 2005.
Jiang, et al., "Fully Dispersion Compensated ~500 fs Pulse Transmission Over 50 km Single Mode Fiber," Purdue University ECE Annual Research Summary, Jul. 1, 2004-Jun. 30, 2005.
Killey, et al., "Electronic Dispersion Compensation by Signal Predistortion Using Digital Processing and a Dual-Drive Mach-Zehnder Modulator," IEEE Photonics Technology Letters, vol. 17, No. 3, pp. 714-716, Mar. 2005.
Kim, K. et al., "1.4kW High Peak Power Generation from an All Semiconductor Mode-locked Master Oscillator Power Amplifier System Based on eXtreme Chirped Pulse Amplification (X-CPA)", Optics Express, Jun. 2, 2005, pp. 4600-4606, vol. 13, No. 12.
Koechner, "Solid State Laser Engineering", Oct. 29, 1999, Section 5.5, pp. 270-277, 5th Edition, Springer.

Kwon, et al., "Tunable Dispersion Slope Compensator Using a Chirped Fiber Bragg Grating Tuned by a Fan-shaped Thin Metallic Heat Channel," IEEE Photonics Technology Letters, vol. 18, No. 1, pp. 118-120, Jan. 1, 2006.

Kyungbum, Kim et al., "1.4kW High Peak Power Generation from an all Semiconductor Mode-locked Master Oscillator Power Amplifier System Based on eXtreme Chirped Pulse Amplification (X-CPA)", Optics Express, Jun. 2, 2005, pp. 4600-4606, vol. 13, No. 12.

Levy et al., "Engineering Space-Variant Inhomogeneous Media for Polarization Control," Optics Letters, Aug. 1, 2004, pp. 1718-1720, vol. 29, No. 15, Optical Society of America.

Liao, K. et al.., "Large-aperture Chirped Volume Bragg Grating Based Fiber CPA System," Optics Express, Apr. 16, 2007, vol. 15, No. 8, pp. 4876-4882.

Lo, S. et al., "Semiconductor Hollow Optical Waveguides Formed by Omni-directional Reflectors", Optics Express, vol. 12, No. 26, Dec. 27, 2004, pp. 6589-6593.

Malinowski A. et al., "Short Pulse High Power Fiber Laser Systems," Proceedings of the 2005 Conference on Lasers and Electro-Optics (CLEO), Paper No. CThG3, pp. 1647-1649, May 26, 2005.

Mehier-Humbert, S. et al., "Physical Methods for Gene Transfer: Improving the Kinetics of Gene Delivery Into Cells," Advanced Drug Delivery Reviews, vol. 57, pp. 733-753, 2005.

Mohammed, W. et al., "Selective Excitation of the TE01 Mode in Hollow-Glass Waveguide Using a Subwavelength Grating," IEEE Photonics Technology Letters, Jul. 2005, vol. 17, No. 7, IEEE.

Nibbering, E.T.J., et al. "Spectral Determination of the Amplitude and the Phase of Intense Ultrashort Optical Pulses," Journal Optical Society of America B, vol. 13, No. 2, pp. 317-329, Feb. 1996.

Nicholson, J. et al., "Propagation of Femotsecond Pulses in Large-mode-area, Higher-order-mode Fiber," Optics Letters, vol. 31, No. 21, 2005, pp. 3191-3193.

Noda, J. et al., "Polarization-maintaining Fibers and Their Applications", Journal of Lightwave Technology, vol. Lt-4, No. 8 Aug. 1986, pp. 1071-1089.

Palfrey et al., "Generation of 16-FSEC Frequency-tunable Pulses by Optical Pulse compression" Optics Letters, OSA, Optical Society of america, Washington, DC, USA, vol. 10, No. 11, Nov. 1, 1985, pp. 562-564, XP000710358 ISSN: 0146-9592.

Pelusi, M. D. et al., "Electrooptic Phase Modulation of Stretched 250-fs Pulses for Suppression of Third-Order Fiber Disperson in Transmission," IEEE Photonics Technology Letters, vol. 11, No. 11, pp. 1461-1463, Nov. 1999.

Pelusi, M. D. et al., "Phase Modulation of Stretched Optical Pulses for Suppression of Third-order Dispersion Effects in fibre Transmission," Electronics Letters, vol. 34, No. 17, pp. 1675-1677, Aug. 20, 1998.

Price et al., "Advances in High Power, Short Pulse, Fiber Laser Systems and Technology", Proceedings of SPIE—vol. 5709, Fiber Lasers II: Technology, Systems, and Applications, Apr. 2005, pp. 184-192.

Price et al., "Advances in High Power, Short Pulse, Fiber Laser Systems and Technology", Photonics West 2005, San Jose, California, Jan. 2005, pp. 5709-3720.

Ramachandran, S., et al., "High-power Amplification in a 2040-μm2 Higher Order Mode," SPIE Photonics West 2007, Post-deadline.

Resan et al., "Dispersion-Managed Semiconductor Mode-Locked Ring Laser", Optics Letters, Aug. 1, 2003, pp. 1371-1373, vol. 28, No. 15, Optical Society of America.

Schreiber, T., et al., "Design and High Power Operation of a Stress-induced single Polarization Single-transverse Mode LMA Yb-doped Photonic Crystal Fiber," Fiber Lasers III: Technology, Systems, and Applications, Andrew J.W. Brown, Johan Nilsson, Donald J. Harter, Andreas Tünnermann, eds., Proc. of SPIE, vol. 6102, pp. 61020C-1-61020C-9, 2006.

Schreiber, T., et al., "Stress-induced Single-polarization Single-transverse Mode Photonic Crystal Fiber with Low Nonlinearity," Optics Express, vol. 13, No. 19, Sep. 19, 2005, pp. 7621-7630.

Siegman, "Unstable Optical Resonators", Applied Optics, Feb. 1974, pp. 353-367, vol. 13, No. 2.

Limpert et al., "All Fiber Chiped-Pulse Amplification System Based on Compression in Air-Guiding Photonic Bandgap Fiber", Optics Express, Dec. 1, 2003, vol. 11, No. 24, pp. 3332-3337.

* cited by examiner

INTELLIGENT LASER INTERLOCK SYSTEM

CROSS-REFERENCE TO RELATED APPLICATIONS

This application claims the benefit of U.S. Provisional Application Ser. No. 60/796,646 entitled "Laser System Software Development Platform," filed Apr. 26, 2006, which is hereby incorporated herein by reference.

BACKGROUND

1. Field of the Invention

The present invention relates in general to the fields of laser light amplification and software control systems.

2. Related Art

Laser interlock systems are configured to ensure a laser system operator's safety and/or to protect one or more laser system components from damage. Laser interlock systems typically include electromechanical systems configured to shutdown a laser system when some operational limit has been exceeded. For example, mechanical laser interlock systems may include mechanical relays connected to simple hardwired logic circuits. The mechanical relays are configured to close a shutter or cut power to one or more laser system components within the laser system, thereby shutting down the laser system. For example, a laser interlock system may be configured to activate a mechanical relay configured to disable laser light generation when a system cover is opened.

The simple approach of prior laser interlock systems causes a total shutdown of the laser system. While ensuring safety, the total shutdown has a number of drawbacks. For example, the laser system may need to be warmed up and calibrated again after a total shutdown before the laser system is again operational. There is, therefore, a need for improvements in laser interlock systems.

SUMMARY

The present invention comprises, in various embodiments, systems and methods for shutting down a laser system in an intelligent and flexible manner. An intelligent laser interlock system includes a first module comprising hardwired components, and a second module comprising intelligent components configured to execute computing instructions. The hardwired components and the intelligent components are configured to shutdown the laser system to one or more alternative shutdown states in response to one or more interlock signals. These alternative shutdown states include intermediate shutdown states in which parts but not all of the laser system are shutdown.

Various embodiments of the invention include a system comprising an oscillator configured to generate a laser light pulse, an amplifier configured to receive the laser light pulse from the oscillator and amplify the laser light pulse, and a control system comprising an input configured to receive an interlock signal, an integrated circuit configured to select a shutdown state from a plurality of alternative shutdown states based on the interlock signal, and an output configured to place the system in the selected shutdown state.

Various embodiments of the invention include a system comprising a light source configured to generate a laser light pulse, and a control system comprising a hardwired interlock module configured to shutdown a first part of the light source, and an intelligent interlock module configured to shutdown a second part of the light source by executing computing instructions.

Various embodiments of the invention include a method comprising receiving an interlock signal, shutting down a laser system to a first shutdown state responsive to the interlock signal, the first shutdown state being an intermediate shutdown state, analyzing the interlock signal, and shutting down the laser system to a second shutdown state based on the analysis of the interlock signal.

DETAILED DESCRIPTION

Figure 1:
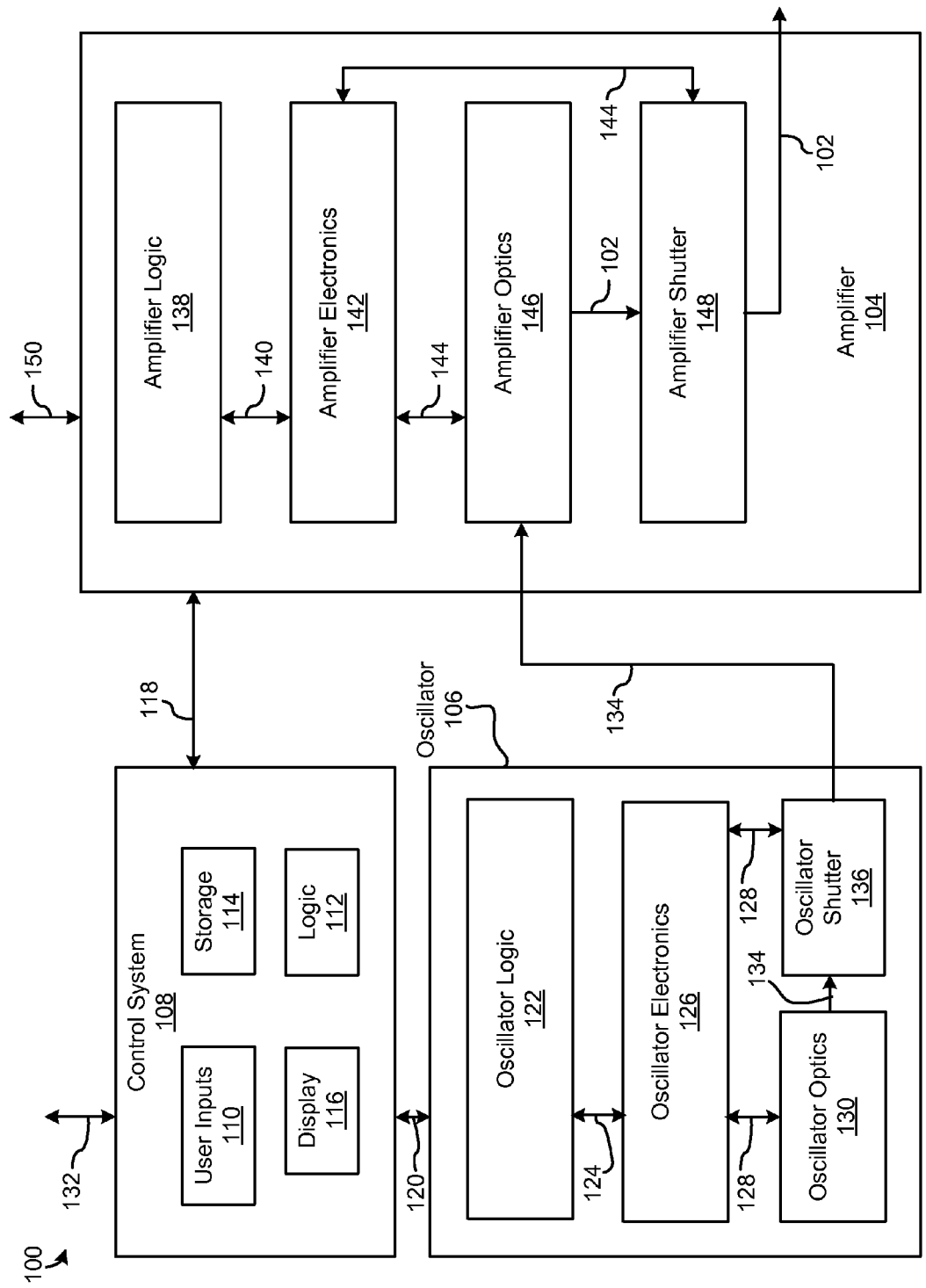
FIG. 1 illustrates a laser system, according to various embodiments of the invention.

In some embodiments of the present invention, an intelligent laser interlock system is configured to shutdown a laser system to one or more alternative shutdown states in an intelligent manner. The laser system typically includes multiple components, such as an optical oscillator configured to generate a laser light pulse and an optical amplifier configured to amplify the laser light pulse. The alternative shutdown states may include one or more partial shutdown states in which some but not all of the multiple laser system components are shutdown. For example, in some embodiments, one of the one or more intermediate (e.g., partial) shutdown states includes shutting down an optical amplifier but not shutting down an optical oscillator. In some embodiments, establishing a shutdown state includes shutting down one or more components external to the laser system.

In some embodiments, the intelligent laser interlock system is configured to be programmed by an end user or a developer to specify one or more system shutdown processes. The developer can be a vendor, a reseller, an original equipment manufacturer, a systems integrator, an engineer, or an entity that provides the intelligent laser interlock system to the end user. The one or more system shutdown processes include a shutdown sequence specifying an order in which laser system components are to be shutdown and including a shutdown timing specifying a time at which each of the one or more laser system components are to be shutdown in relation to one another. Each of the one or more system shutdown processes is configured to place the laser system into one of the plurality of shutdown states.

In various embodiments, the intelligent laser interlock system is configured to shut down the one or more laser system components in a shutdown sequence starting with one or more downstream components and ending with one or more upstream components. Upstream and downstream are defined with respect to the direction of propagation of the laser beam. For example, those laser system components that are configured to initially generate a laser light pulse are considered to be upstream relative to those components that amplify the generated laser light pulse.

The intelligent laser interlock system includes a hardwired interlock module whose functionality is determined by hardwired electrical connections and optionally simple logic gates. Functionality of the hardwired components is typically fixed and not configurable without rewiring or physically changing circuits. The hardwired interlock module is configured to respond to one or more hardwired interlock triggers by activating relays, shutters, and/or the like. For example, a hardwired interlock trigger may be activated by opening of a system cover. The hardwired interlock module may respond to this hardwired interlock trigger by closing a shutter such that a user is not exposed to laser light.

The intelligent laser interlock system further includes an intelligent interlock module whose functionality is determined by computing instructions. The intelligent interlock module is typically configured to respond to one or more intelligent interlock triggers by executing these computing instructions. The computing instructions may be configured to sequentially shut down components of the laser system in a prescribed order, to shut down the laser system to an intermediate shutdown state responsive to an analysis of the intelligent interlock trigger, to enable and disable various control signals, to operate relays, to operate shutters, and/or the like.

In some embodiments, the intelligent interlock module is configured to be programmed in order to customize a system shutdown process. For example, a user may program the system shutdown process via an external computer system, a software program, or a laser system control panel. Alternatively, a vendor may program the system shutdown process via an external computer system, an Application Specific Integrated Circuit (ASIC), a Field Programmable Gate Array (FPGA), a microprocessor, software, or firmware. The computing instructions that the intelligent interlock module is configured to execute may be embodied in firmware, hardware, or software stored on a computer readable medium. The intelligent interlock module may comprise a microprocessor, an integrated circuit, a Field Programmable Gate Array, a programmable logic device, or the like. The intelligent interlock module may also be configured to connect to an external computer system.

An intelligent interlock trigger may be configured to be activated if the temperature of an optical amplifier exceeds a predetermined threshold. In response to this intelligent interlock trigger, the intelligent interlock module may cause a partial shutdown of the optical amplifier module such that the optical amplifier module can cool. This partial shutdown of the optical amplifier may not require shutdown of other system components of the laser system. The intelligent interlock module enables minor anomalous situations requiring a partial shutdown to be efficiently handled while maintaining an operational readiness state in the rest of the laser system.

FIG. 1 illustrates various embodiments of a laser system generally designated 100 and configured to generate a laser beam output 102 using an amplifier 104 and an oscillator 106 under the control of a control system 108. This control includes causing the oscillator 106 and amplifier 104 to generate the laser beam output according to a user's needs as well as managing the intelligent interlock system. The control system 108, the oscillator 106, and the amplifier 104 are typically each electrically connected to one another and are optionally included within a single enclosure. For example, there are electrical connections between oscillator 106 and amplifier 104 that are not shown in FIG. 1.

The control system 108 comprises a plurality of components including control logic 112, optional user inputs 110, an optional external control interface 132, an optional display 116, and optional storage 114. In some embodiments, the control system 108 includes a self-contained computer system, such as a standard commercially available single board computer. Typically, the control system 108 is configured to run a real time operating system along with a laser control software application. In other embodiments, the control system 108 is based on an embedded microcomputer or microcontroller and runs a laser control program. In still other embodiments, the control system 108 is based on an Application Specific Integrated Circuit (ASIC) or a programmed Field Programmable Gate Array (FPGA).

User inputs 110 include controls configured for a user to operate the laser system 100. These controls may be manual or electronic. For example, user inputs 110 may include a keyboard, one or more buttons, a touch screen, a dial, switches, and/or the like. The user inputs 110 are configured for turning a laser beam on, turning the laser beam off, selecting one or more characteristics of the laser beam, and the like.

The display 116 is typically a liquid crystal or light emitting diode display. In various embodiments, the display 116 is configured to display system states, e.g., shutdown states, of the laser system 100 to a user. The system states may include, for example, information regarding repetition rate, component temperature, pulse width, pulse energy, or the like. Shutdown states may also include a list of components that are shutdown, a list of components that are not shutdown, why components were shutdown, a list of interlock triggers, or the like.

External control interface 132 is configured to communicate commands and/or data to or from one or more systems external to laser system 100. For example, external control interface 132 may be configured to communicate with a robot, an external trigger, a remote control, or an external interlock. In some embodiments, external control interface 132 is configured to communicate using a network protocol, such as TCP/IP. In various embodiments, the external control interface 132 includes a hardwired connection such as a single wire, a pair of wires, a USB interface, an Ethernet network interface, a FireWire interface, an RS-232 interface, a GPIB interface, or the like. Alternatively, the external control interface 132 includes a wireless connection such as a WiFi connection, a Bluetooth connection, a ZigBee connection, or the like.

In various embodiments, the external control interface 132 is configured to communicate one or more external interlock control inputs and/or outputs. External interlock control inputs are configured for external control circuitry or external computer systems to activate the intelligent laser interlock system. For example, in some embodiments, a first external interlock control input is configured to receive a hardwired interlock trigger and a second external interlock control input is configured to receive an intelligent interlock trigger. In some embodiments, external interlock control outputs are configured to control external circuitry or computer systems in response to an interlock trigger. For example, an external interlock control output may be used to shutdown an external device in response to an intelligent interlock trigger.

The storage 114 is configured to store operating parameters, logs of events that occur in the laser system 100, snapshots of system states of the laser system 100, and/or the like. For example, in some embodiments, the storage 114 is configured to store a snapshot of the state of laser system 100 at the time an interlock trigger is received. The storage 114 may include volatile memory, non-volatile memory, a hard drive, an optical drive, or the like.

The control logic 112 includes logic configured to execute computing instructions. For example, control logic 112 may include a processor, an application specific integrated circuit, a field programmable gate array, or the like. As is described further herein, the computing instructions executed by the control logic 112 include those used to respond to intelligent interlock triggers. The control logic 112 also includes wiring, comparators, logic gates (e.g., simple NAND, OR, and AND gates), and the like configured to perform hardwired operations. These hardwired operations include those used to respond to hardwired interlock triggers.

The oscillator 106 comprises oscillator logic 122, oscillator electronics 126, oscillator optics 130, and an optional oscillator shutter 136. The control system 108 is configured to communicate with oscillator 106 through one or more connections 120. This communication may include the transmission of control signals and/or commands to the oscillator logic 122, and may include receipt of status information, such as temperature, beam characteristics, beam alignment, error conditions, and interlock triggers from oscillator electronics 126.

The oscillator logic 122 comprises circuitry configured to control and monitor the oscillator 106. For example, in various embodiments, the oscillator logic 122 receives a plurality of command and control data signals from the control system 108 via connections 120 and, in turn, generates appropriate signals to control the oscillator electronics 126. In addition, the oscillator logic 122 typically includes circuitry configured to monitor one or more components of oscillator 106, and provide appropriate signals back to the control system 108 via connections 120. These signals may include interlock triggers and/or data indicative of a state of the oscillator 106. Oscillator logic 122 is coupled to oscillator electronics 126 via connections 124.

The oscillator electronics 126 are configured to supply power to the oscillator optics 130, and may include for example power amplifiers, trigger signals, heater power supplies, laser diode inputs, and/or the like. The oscillator electronics 126 are also configured to generate signals representative of states of oscillator 106. For example, the oscillator electronics 126 may include a temperature sensor and transducer, a flow sensor, a photodetector, a position sensor, and/or the like. The oscillator electronics 126 are optionally configured to control the oscillator shutter 136. The oscillator electronics 126 are coupled to the oscillator optics 130 and the oscillator shutter 136 via connections 128.

The oscillator optics 130 are configured to generate light pulses. These laser light pulses may be characterized by a laser light pulse power, a temporal width, a repetition rate, and a wavelength distribution. The pulse power may be defined as an average optical power present in the laser beam per unit time, or a peak power present in a single light pulse. In some embodiments, the light pulses generated by the oscillator optics 130 are chirped light pulses. The oscillator optics 130 may include a ring laser, an optical oscillator, a Bragg fiber, a pulse stretcher, a fiber optic, an optical pump source, an optical switch, and/or the like.

The oscillator shutter 136 is configured to block optical path 134 such that light pulses generated by the oscillator optics 130 are prevented from reaching the amplifier 104. The oscillator shutter 136 may include a mechanical shutter or an optical switch.

The amplifier 104 is configured to amplify optical pulses received from the oscillator 106 via the optical path 134. Amplifier 104 comprises an amplifier logic 138, an amplifier electronics 142, an amplifier optics 146, an optional external interface 150, and an optional amplifier shutter 148. The control system 108 is configured to communicate data and/or commands to the amplifier logic 138 through connections 118, and is further configured to receive data such as status and error conditions from the amplifier logic 138 through the amplifier connections 118.

The amplifier logic 138 comprises circuitry configured to control and monitor the amplifier 104. For example, in various embodiments, the amplifier logic 138 receives a plurality of command and control data signals from the control system 108 via connections 118 and, in turn, generates appropriate signals to control the amplifier electronics 142. In addition, the amplifier logic 138 typically includes circuitry configured to monitor one or more components of amplifier 104, and provide appropriate signals back to the control system 108 via connections 118. These signals may include interlock triggers and/or data indicative of a state of amplifier 104. The amplifier logic 138 is coupled to the amplifier electronics 142 via connections 140.

The amplifier electronics 142 are configured to supply power to amplifier optics 146, and may include for example power amplifiers, trigger signals, heater power supplies, laser diode inputs, and/or the like. Amplifier electronics 142 are also configured to generate signals representative of states of amplifier 104. For example, amplifier electronics 142 may include a temperature sensor and transducer, a photodetector, a position sensor, and/or the like. Amplifier electronics 142 are optionally configured to control amplifier shutter 148. Amplifier electronics 142 are coupled to amplifier optics 146 and amplifier shutter 148 via connections 144.

The amplifier optics 146 are configured to amplify light pulses received from oscillator optics 130. In some embodiments, the light pulses generated by oscillator optics 130 are chirped light pulses and amplifier optics 146 includes optics, such as a Bragg fiber, configured to temporally compress the amplified pulse. The amplifier optics 146 may include fiber optics, free space optics, a thin film amplifier and/or a fiber amplifier. In various embodiments, the amplified pulse is less than 1 nanosecond, 3 picoseconds, or 900 femtoseconds in width. The amplified pulse is provided as laser beam output 102.

Amplifier shutter 148 is configured to block the laser beam output 102 such that light pulses amplified by amplifier optics 146 do not leave laser system 100. Amplifier shutter 148 may include a mechanical shutter or an optical switch.

In various embodiments, the amplifier 104 is configured to communicate with one or more external systems via the external interface 150. These external systems may include an external interlock, a robot, an external trigger, a remote control, or an external interlock. In various embodiments, the external interface 150 is configured to communicate one or more external interlock control inputs and/or outputs. For example, external interface 150 may be used to communicate a signal from intelligent interlock logic 290 to shutdown an external device, or may receive an intelligent interlock trigger from an external device.

In various embodiments, operation of the laser system 100 is subject to an intelligent interlock system. In some embodiments, the intelligent interlock system is configured to separately shut down oscillator 106 and amplifier 104 in response to hardwired and/or intelligent interlock triggers.

Figure 2:
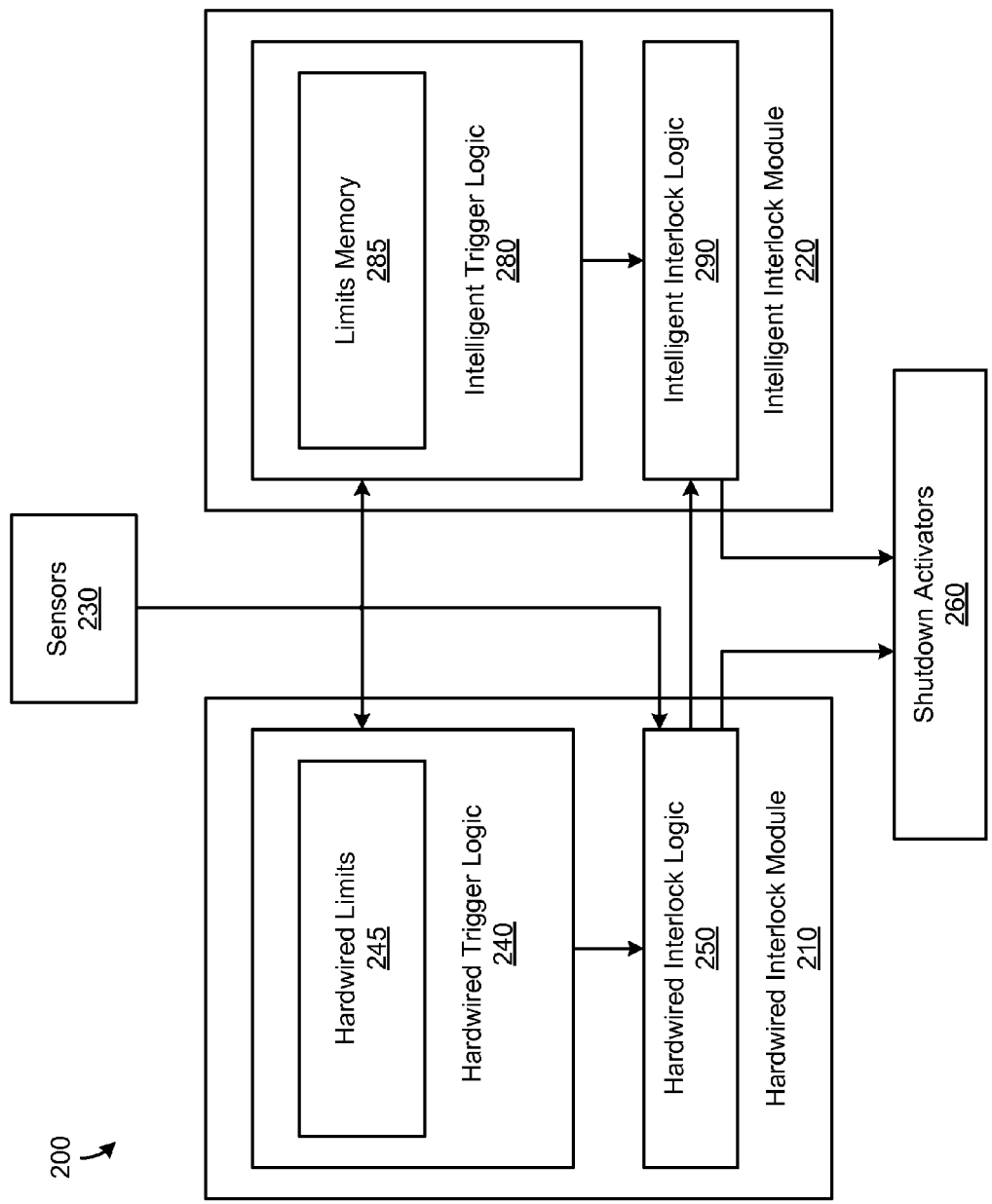
FIG. 2 is a block diagram that illustrates an intelligent laser interlock system, according to various embodiments of the invention.

FIG. 2 is a block diagram of an intelligent laser interlock system generally designated 200, according to various embodiments of the invention. The intelligent laser interlock system 200 comprises a hardwired interlock module 210 and an intelligent interlock module 220. As is described further herein, components of the intelligent interlock system 200 may be distributed among the control system 108, the oscillator 106 and the amplifier 104. Typically, the hardwired interlock module 210 is configured to respond to conditions that require immediate and/or invariant response. For example, the hardwired interlock module 210 may be configured to respond to opening of a system cover by closing amplifier shutter 148 (FIG. 1). In some embodiments, it is desirable that this response be as quick as possible.

Relative to the hardwired interlock module 210, the intelligent interlock module 220 is typically configured to respond to conditions that require less immediate and/or more variant response. For example, the intelligent interlock module 220 may adjust the electrical power provided by amplifier electronics 142 or a laser pulse repetition rate in response to a temperature measurement.

As is described further herein, in some embodiments, both the hardwired interlock module 210 and the intelligent interlock module 220 are used to respond to the same condition. For example, if the system cover is opened the hardwired interlock module 210 may close the amplifier shutter 148 and the intelligent interlock module 220 may turn off high voltage circuits.

The hardwired interlock module 210 and intelligent interlock module 220 are each responsive to sensors 230. Sensors 230 are configured to detect a condition of laser system 100 such as a temperature, voltage level, coolant flow, position, light pulse characteristic, and/or the like. For example, in various embodiments, sensors 230 include a thermocouple, an analog to digital converter, a flow meter, position sensors, and photodiodes. Sensors 230 are configured to generate an electrical signal, such as a hi-low (e.g, TTL) logic signal, an analog signal, or a multi-bit digital signal. Some of sensors 230 may be dedicated to sending the generated electrical signal to hardwired interlock module 210, some of sensors 230 may be dedicated to sending the generated electrical signal to intelligent interlock module 220, and some of sensors 230 may send electrical signals to both interlock modules. Sensors 230 may be included in any part of laser system 100.

The hardwired interlock module 210 and intelligent interlock module 220 are both configured to control shutdown activators 260. The shutdown activators 260 may include relays configured to break electrical connections, enable/disable signals, analog signals, switchers, mechanical shutters and/or positioners, warning messages, and/or the like. The shutdown activators 260 may also include system control elements such as parts of oscillator logic 122 or amplifier logic 138 configured to control pulse repetition rates or output powers. For example, intelligent interlock module 220 may be configured to respond to a measured temperature by changing a pulse repetition rate.

The hardwired interlock module 210 includes an optional hardwired trigger logic 240 and a hardwired interlock logic 250. The hardwired trigger logic 240 is configured to receive an output of sensors 230 and determine if the output represents a state that requires generation of a hardwired interlock trigger. A hardwired interlock trigger is typically a binary signal (e.g., a hi-low signal) that indicates that an interlock should be activated. The hardwired trigger logic 240 may include simple logic gates, comparators, analog-to-digital converters, and/or the like. For example, in some embodiments, the hardwired trigger logic 240 is configured to receive an analog signal from a member of sensors 230 and to compare this signal to a threshold voltage provided by a hardwired limits 245. A hardwired interlock trigger may then be generated in response to this comparison. In another example, the outputs of several of sensors 230 may be processed through simple logic gates, to generate a hardwired interlock trigger.

Hardwired interlock triggers generated by the hardwired trigger logic 240 are provided to hardwired interlock logic 250. The hardwired trigger logic 240 is optionally in embodiments wherein the output of one of sensors 230 is communicated directly to hardwired interlock logic 250. For example, if sensors 230 generate a binary signal, then this signal may be used directly by hardwired interlock logic 250.

The hardwired interlock logic 250 is typically configured to receive a variety of different hardwired interlock triggers from hardwired trigger logic 240. For example, hardwired interlock logic 250 may be configured to receive different hardwired interlock triggers corresponding to different members of sensors 230. Hardwired interlock logic 250 includes circuits configured for controlling which of shutdown activators 260 are activated by different hardwired trigger logic 240. These circuits optionally include NAND gates, AND gates, OR gates, and/or the like. In some embodiments, hardwired interlock logic 250 includes a direct connection between hardwired trigger logic 240 or sensors 230 and a member of shutdown activators 260.

The communication of hardwired interlock triggers between hardwired trigger logic 240 and hardwired interlock logic 250 may be serial or parallel. In some embodiments, particular hardwired interlock triggers are identified by the electrical connection through which they are received. In some embodiments, there is a separate electrical connector between hardwired trigger logic 240 and hardwired interlock logic 250 for each possible hardwired interlock trigger.

The hardwired interlock logic 250 is optionally further configured to communicate signals to an intelligent interlock logic 290 included in intelligent interlock module 220. These signals are discussed further elsewhere herein.

In addition to intelligent interlock logic 290, intelligent interlock module 220 includes intelligent trigger logic 280. Intelligent trigger logic 280 is configured to receive signals from sensors 230 and determine if an intelligent interlock trigger should be generated. In some embodiments, the intelligent trigger logic 280 includes the same elements and features as the hardwired trigger logic 240. However, intelligent trigger logic 280 may further include a limits memory 285 configured to store electronically programmable thresholds. These electronically programmable thresholds may be configured by writing data to the intelligent trigger logic 280. For example, in some embodiments, the electronically programmable thresholds can be configured by entering data through the user inputs 110 or through external control interface 132.

In some embodiments, hardwired interlock module 210 includes direct electrical connections that connect the output of sensors 230 to shutdown activators 260. These direct electrical connections may be configured to communicate a response as quickly as possible.

The intelligent trigger logic 280 is configured to compare data stored in limits memory 285 with signals received from sensors 230 in order to determine whether or not an intelligent interlock trigger should be generated. The signals received from sensors 230 are optionally digitized prior to this comparison. An intelligent interlock trigger is a signal that indicates that an interlock should be activated. The intelligent interlock trigger may be a binary signal or a set of binary signals (e.g. a set of bits). For example, the intelligent interlock trigger may include one, two or more bytes of data. In one embodiment, the intelligent interlock trigger includes a first byte indicating the identity of the member of sensors 230 whose signal caused the intelligent interlock trigger. Additional bytes may include quantitative information regarding the signal. For example, a second byte may indicate how far a sensed temperature is above a temperature threshold. In some embodiments, intelligent trigger logic 280 is configured to compare received sensor signals with calculated values, such as a calculated calibration value. Some limits may be determined during operation of laser system 100. For example, minimum and maximum pulse energies may be entered by a user.

The intelligent interlock trigger generated by intelligent trigger logic 280 is received by intelligent interlock logic 290. Intelligent interlock logic 290 is configured to respond to the intelligent interlock trigger by executing computing instructions. These computing instructions may be embodied in hardware, firmware, or software stored on a computer readable medium. These computing instructions are also optionally reconfigurable. As such, the operation of intelligent interlock logic 290 can be customized. Intelligent interlock logic 290 optionally includes a processor and memory configured to execute and store computing instructions, respectively.

Because intelligent interlock logic 290 is capable of executing computing instructions, intelligent interlock logic 290 can respond to intelligent interlock triggers with operations that include conditional statements (e.g., IF, WHILE, UNTIL, CASE, etc.) and these statements may be dependent on comparisons (e.g., A>B, A=B, A≠B, etc.). Using these operations, intelligent interlock logic 290 may be configured to respond to an intelligent interlock trigger as a function of a state of the laser system 100. For example, intelligent interlock logic 290 may respond differently to a detected high temperature depending on a current laser pulse repetition rate.

In some embodiments, different responses to an intelligent interlock trigger are enabled as the laser system 100 is brought through a self-test and through a warm-up period. For example, during warm-up, temperatures, electrical conditions and optical parameters may be expected to drift by a greater amount than when the laser system 100 is fully warmed up. Thus, intelligent trigger logic 280 may be configured to use wider limits during the warm-up period and narrower limits following the warm-up period.

In some embodiments, limits used by intelligent trigger logic 280 are dependent on the state of laser system 100. For example, in a continuous pulses mode where pulses are produced nearly continuously at a high repetition rate (e.g., >500 kHz) the average power detected at an optical output sensor would be expected to be nearly constant. Therefore, limits related to an output power are applicable to monitoring system performance. However, in a triggered mode in which one pulse is generated in response to one trigger event, the laser system 100 may be on while there are longer periods between pulses. During these periods, observation of the output power is not indicative of the system performance and limits related to the output power would not be used.

Intelligent interlock logic 290 is optionally further configured to operate shutdown activators 260 so as to shut down laser system 100 to one or more intermediate shutdown states. By bringing laser system 100 to an intermediate shutdown state, rather than completely shutting down laser system 100, it may be possible to restore laser system 100 to a fully operational state more quickly. Intelligent interlock logic 290 is optionally configured to shut down parts of laser system 100 in a variety of alternative orders.

In some embodiments, intelligent interlock logic 290 is configured to shutdown laser system 100 to an intermediate shutdown state in which oscillator optics 130 are being used to generate laser pulses but amplifier optics 146 are not provided with power to amplify the generated laser pulses. In some embodiments, intelligent interlock logic 290 is configured to shut down dangerous parts (e.g., high voltages and high power pulse sources) of the laser system 100 in a first shutdown state, and to shut down safe (e.g., low power) parts of the laser system 100 in a second shutdown state.

In some embodiments, hardwired interlock module 210 is configured to shutdown laser system 100 from a fully operation state to a first intermediate shutdown state, and intelligent interlock module 220 is configured to determine whether or not laser system 100 should be shutdown from the first intermediate shutdown state to a second shutdown state or to a fully shutdown state. For example, in response to a signal from sensors 230, hardwired interlock module 210 may shutdown operation of amplifier 104 and send an interlock trigger from hardwired interlock logic 250 to intelligent interlock logic 290. The shutdown of amplifier 104 is an example of an intermediate shutdown state and is facilitated by the relatively rapid response of hardwired interlock module 210. Intelligent interlock module 220 is configured to respond to the interlock trigger received from hardwired interlock module 210 by identifying a state of laser system 100. This state may include operational characteristics of oscillator 106 as well as information indicating that the operation of amplifier 104 is already shutdown. Based on the received interlock trigger and the determined state, intelligent interlock logic 290 may then determine if the generation of laser pulses using oscillator optics 130 should be shutdown, or if amplifier 104 can be restarted without first shutting down amplifier 104.

In some embodiments, intelligent interlock system 200 is considered to store one or more snapshots of the state of laser system 100. These snapshots may reflect states of laser system 100 before, during, and/or after receipt of an interlock trigger. For example, in some embodiments, control system 108 is configured to periodically store a state of laser system 100 in Storage 114. This state may be updated, for example, every 0.5 or 1.0 seconds. When intelligent interlock trigger or hardwired interlock trigger is generated, control system 108 is configured to preserve (e.g., save) the stored state such that the stored state can be used for later analysis. In some embodiments, control system 108 is configured to store a state of laser system 100 while in an intermediate shutdown state. For example, laser system 100 may be changed from a fully operational state to a first intermediate state by shutting down all or part of amplifier 104. In the first intermediate state, a state of laser system 100 may be saved for later use, and then the laser system 100 may be shutdown from the first intermediate state to a second intermediate shutdown state. Another state of the laser system 100 is optionally saved at the second intermediate shutdown state.

Saved states of laser system 100 are optionally included in event logs exported by control system 108. For example, control system 108 may be configured to include system states and events in a log. This log may be exported through external control interface 132. The events included in the log may comprise, for example, activation and deactivation of components, a number and characteristics of laser pulses produced, interlock triggers, movement of alignment optics, and/or the like.

While hardwired interlock module 210 and intelligent interlock module 220 are illustrated as separate modules in FIG. 2, in alternative embodiments these modules may share components. For example, hardwired trigger logic 240 and intelligent trigger logic 280 may share circuits.

Figure 3:
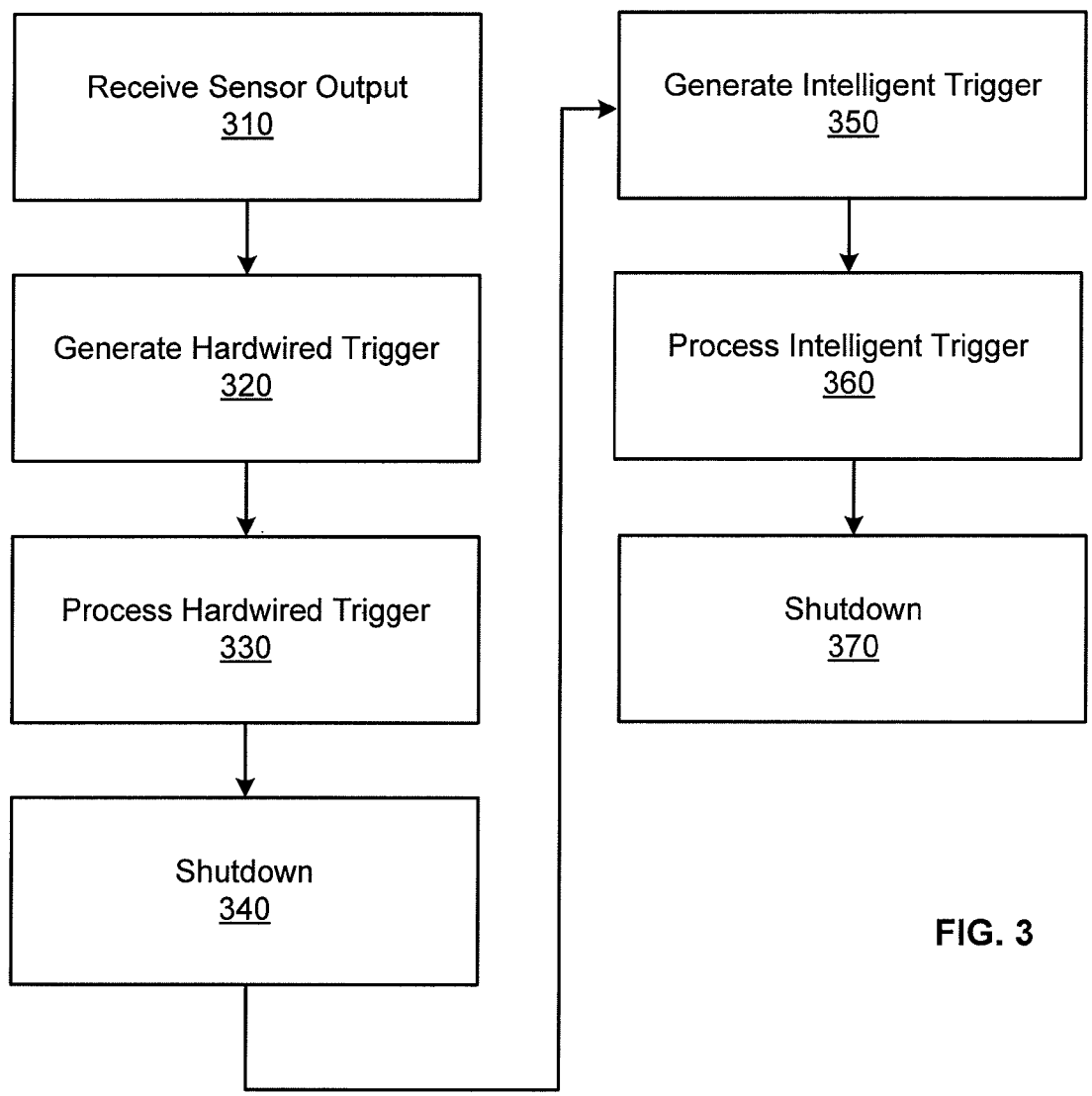
FIG. 3 illustrates methods of using the intelligent laser interlock system illustrated in FIG. 2, according to various embodiments of the invention.

FIG. 3 illustrates methods of using intelligent interlock system 200, according to various embodiments. In these methods, the output of one or more of sensors 230 is used to generate both a hardwired interlock trigger and an intelligent interlock trigger. These two interlock triggers are processed using hardwired interlock logic 250 and intelligent interlock logic 290, respectively. As a result of this processing, laser system 100 is shut down to one or more different shutdown states.

More specifically, in a receive sensor output step 310 an output of sensors 230 is received by hardwired trigger logic 240. Typically, this output is received through a high speed connection, such as a direct wire. As is described elsewhere herein, the sensor output may include a temperature, a position, a flow, a characteristic of a laser pulse, and/or the like. The sensor output is optionally received by intelligent trigger logic 280 at approximately the same time as hardwired trigger logic 240.

In a generate hardwired trigger step 320, the received sensor output is used to generate a hardwired interlock trigger using hardwired trigger logic 240. In some embodiments, generation of the hardwired interlock trigger includes merely passing the received sensor signal to an output of hardwired trigger logic 240. For example, if the sensor output is a 0V to 5V signal generated by a system cover position sensor, then this signal may be used directly as a hardwired interlock trigger. In some embodiments, generation of the hardwired interlock trigger includes digitizing the received sensor signal, comparing the received sensor signal with a threshold, and/or passing the received sensor signal though simple logic gates. The generated hardwired interlock trigger is passed to hardwired interlock logic 250.

In a process hardwired trigger step 330, the hardwired interlock trigger provided to hardwired interlock logic 250 by hardwired trigger logic 240 is processed in order to control an appropriate member of shutdown activators 260. In some embodiments, a single hardwired interlock trigger may result in activation of more than one of shutdown activators 260. For example, one of shutdown activators 260 may be used to close oscillator shutter 136 while another of shutdown activators 260 may be used to disable part of amplifier electronics 142.

In some embodiments, the processing performed by hardwired interlock logic 250 in process hardwired trigger step 330 includes merely passing a received hardwired interlock trigger to an appropriate shutdown activator. For example, the 0V to 5V output of a system cover position sensor may be passed directly to a shutter control motor. In some embodiments, the hardwired interlock logic 250 is configured to activate several members of shutdown activators 260 in response to one hardwired interlock trigger. In some embodiments, the hardwired interlock 250 is configured to activate one of shutdown activators 260 in response to a logical combination of different hardwired interlock triggers.

Process hardwired trigger step 330 may also include communication of an interlock trigger from hardwired interlock logic 250 to intelligent interlock logic 290. This interlock trigger is treated as an intelligent interlock trigger by intelligent interlock logic 290 as, for example, is further described below with respect to a step 360.

In a shutdown step 340, all or part of laser system 100 is shutdown using one or more members of shutdown activators 260 in response to signals received from hardwired interlock logic 250. In some embodiments, parts of laser system 100 are shut down in a sequence from upstream components to downstream components. For example, amplifier optics 146 may be shut down before oscillator electronics 126. In some embodiments, hardwired interlock module 210 is configured to place laser system 100 in an intermediate shutdown state in which parts of amplifier 104 are shutdown while oscillator electronics 126 and/or oscillator optics 130 are still operational.

In an optional generate intelligent interlock trigger step 350 an intelligent interlock trigger is generated using intelligent trigger logic 280 in response to receiving a signal from one of sensors 230. Generate intelligent interlock trigger step 350 may include comparison of the received signal to a customizable threshold stored in limits memory 285. The generated intelligent interlock trigger may include a multi-bit data. Generate intelligent trigger step 350 is optionally performed in parallel with generate hardwired trigger step 320.

In a process intelligent trigger step 360, an intelligent interlock trigger is processed using intelligent interlock logic 290. The intelligent interlock trigger may be that generated in generate intelligent interlock trigger step 350 and/or an interlock trigger received from hardwired interlock logic in process hardwired trigger step 330. Process intelligent trigger step 360 and/or generate intelligent trigger step 350 are optionally performed in parallel with process hardwired trigger step 330.

The intelligent interlock trigger is processed by executing computing instructions. These computing instructions are optionally user customizable and may be configured to shutdown laser system 100 from a first intermediate shutdown state to another intermediate shutdown state or to a complete shutdown state. In some embodiments, these computing instructions are configured to differentiate between different types of intelligent interlock triggers and determine which intermediate shutdown state the laser system 100 should be placed in based on a determined type.

In some embodiments, the computing instructions are configured to analyze the intelligent interlock trigger and determine if the laser system 100 can be restored to a fully operational state from an intermediate shutdown state. In some embodiments, intelligent interlock logic 290 is configured to determine that an external device should be shut down by sending signals through external control interface 132 or external interface 150. In some embodiments, the computing instructions are configured to save one or more states of laser system 100 or send log information to an external device in response to an intelligent interlock trigger.

In a shutdown step 370, the state of laser system 100 is changed according to the processing of process intelligent trigger step 360. This change may include bringing the laser system 100 from a fully operational state to an intermediate shutdown state, from a first intermediate shutdown state to a second shutdown state, or from an intermediate shutdown to a complete shutdown state.

Figure 4:
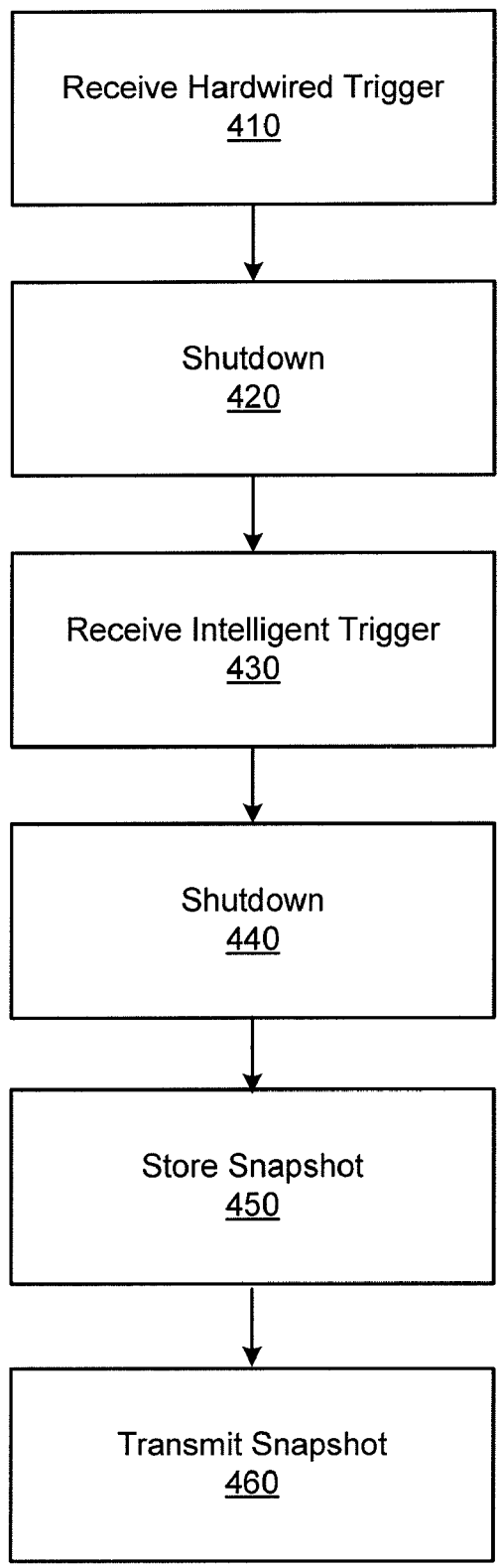
FIG. 4 illustrates methods of shutting down the laser system of FIG. 1, according to various embodiments of the invention.

FIG. 4 illustrates methods of shutting down the laser system 100 into a plurality of shutdown states, according to various embodiments. In these methods, the system is placed in a first shutdown state in response to a hardwired interlock trigger and placed in a second shutdown state in response to an intelligent interlock trigger. One or more snapshots of the state of laser system 100 may also be saved in response to the interlock triggers.

Specifically, in a receive hardwired trigger step 410 hardwired interlock logic 250 receives and processes a hardwired interlock trigger. This interlock trigger is processed using hardwired logic as is described elsewhere herein. The results of the processing may include sending one or more signals to shutdown activators 260, sending an interlock trigger to intelligent interlock logic 290, saving a state of laser system 100, sending log data to one or more external devices, and/or the like.

In a shutdown step 420, the state of laser system 100 is changed using shutdown activators 260 in response to the processing of the hardwired interlock trigger in receive hardwired trigger step 410. This state change may include shutting down parts of amplifier 104 and/or parts of oscillator 106 in order to reach an intermediate shutdown state.

In a receive intelligent trigger step 430 an intelligent interlock trigger is received and processed by intelligent interlock logic 290. Receive intelligent trigger step 430 is optionally performed in parallel with receive hardwired trigger step 410 and/or shutdown step 420. The intelligent interlock trigger may be received from hardwired interlock logic 250 and/or intelligent trigger logic 280, or from an external device via external interface 150.

The intelligent interlock trigger is processed by executing computing instructions included within intelligent interlock logic 290. As is described elsewhere herein, these computing instructions may be user configurable.

In a shutdown step 440, the state of laser system 100 is changed for a second time based on the processing in receive intelligent trigger step 430. The second change in state may be from a first intermediate shutdown state to a second intermediate shutdown state, from the first intermediate shutdown state to a fully operational state, or from the first intermediate shutdown state to essentially completely shutdown state (e.g., a state in which neither oscillator optics 130 nor amplifier optics 146 are used to generate laser light.)

In an optional store snapshot step 450, one or more snapshots of states of laser system 100 are saved. Store snapshot step 450 may be performed several times in the methods illustrated by FIG. 4. For example, store snapshot step 450 may occur in response to receive hardwired trigger step 410, in parallel with shutdown step 420, in response to receive intelligent trigger step 430, in parallel with shutdown step 440, and/or after the completion of shutdown step 440. The snapshot stored in store snapshot step 450 may be a snapshot that was first saved prior to receive hardwired trigger step 410 and is stored on a more permanent basis in store snapshot step 450.

In an optional transmit snapshot step 460, the one or more snapshots stored in step 450 are transmitted from laser system 100 to an external device via external control interface 132. Transmit snapshot step 460 may also include transmitting an event log to the external device.

Several embodiments are specifically illustrated and/or described herein. However, it will be appreciated that modifications and variations are covered by the above teachings and within the scope of the appended claims without departing from the spirit and intended scope thereof. For example, systems and methods of the invention may include more than one of intelligent interlock module 200. One of intelligent interlock module 200 may be used to control more than one amplifier 104. Some laser system components that are described as being disposed within the oscillator 106 may be disposed within the control system 108 or within the amplifier 104 while being configured to perform an essentially similar function. Some laser system components that are described as being disposed within the amplifier 104 may be disposed within the control system 108 or within the oscillator 106 while being configured to perform an essentially similar function. In some embodiments, signals from external control interface 132 and/or external interface 150 are used as inputs to hardwired trigger logic 240 and/or intelligent trigger logic 280, in addition to or as an alternative to signals from sensors 230. The signals from external control interface 132 and external interface 150 may be used to generate hardwired interlock triggers and/or intelligent interlock triggers, as described elsewhere herein.

The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

What is claimed is:

1. A system comprising:
  a light source including an amplifier and an oscillator, the oscillator configured to generate a laser light pulse;
  the amplifier configured to receive the laser light pulse from the oscillator and amplify the laser light pulse;
  a first interlock module communicatively coupled with the oscillator and configured to shutdown a first component of the light source;
  a second interlock module communicatively coupled with the oscillator and configured to shutdown a second component of the light source by executing computing instructions; and
  a control system comprising
    an input configured to receive an interlock signal,
    an integrated circuit configured to select a shutdown state from a plurality of alternative shutdown states based on the interlock signal, and
    an output configured to place the system in the selected shutdown state,
    wherein the control system is configured to control a plurality of oscillators.

2. The system of claim 1, wherein one shutdown state includes shutting down the amplifier but not the oscillator.

3. A system comprising:
  a light source including an amplifier and an oscillator, the oscillator configured to generate a laser light pulse;
  the amplifier configured to receive the laser light pulse from the oscillator and amplify the laser light pulse;
  a first interlock module communicatively coupled with the oscillator and configured to shutdown a first component of the light source;
  a second interlock module communicatively coupled with the oscillator and configured to shutdown a second component of the light source by executing computing instructions; and
  a control system comprising
    an input configured to receive an interlock signal,
    an integrated circuit configured to select a shutdown state from a plurality of alternative shutdown states based on the interlock signal, and
    an output configured to place the system in the selected shutdown state,
    wherein the control system is configured to control a plurality of amplifiers.

4. The system of claim 1, wherein the control system is configured to store a snapshot of a system state.

5. The system of claim 1, wherein the control system is configured to communicate with an external computer system.

6. The system of claim 1, wherein a duration of the laser light pulse is less than 1 nanosecond.

7. The system of claim 1, wherein a duration of the laser light pulse is less than 3 picoseconds.

8. A method comprising:
  receiving an output signal from a sensor at a first trigger logic of a first interlock module;
  generating a first interlock trigger using first trigger logic of the first interlock module;
  processing the first interlock trigger;

changing a laser system to a first shutdown state responsive to the interlock signal processing of the first interlock trigger, the first shutdown state being an intermediate shutdown state;
receiving and processing a second interlock trigger by second interlock logic;
analyzing the interlock signal; and
shutting down the laser system to a second shutdown state based on the processing of the second interlock trigger,
wherein changing the laser system comprises shutting down one or more system components in a sequence from a downstream component to an upstream component.

9. The method of claim 8, further comprising storing a snapshot of a system state.

10. A method comprising:
receiving an output signal from a sensor at a first trigger logic of a first interlock module;
generating a first interlock trigger using first trigger logic of the first interlock module;
processing the first interlock trigger;
changing a laser system to a first shutdown state responsive to the interlock signal processing of the first interlock trigger, the first shutdown state being an intermediate shutdown state;
receiving and processing a second interlock trigger by second interlock logic;
analyzing the interlock signal; and
shutting down the laser system to a second shutdown state based on the processing of the second interlock trigger, wherein changing the laser system to the first shutdown state includes halting the amplification of pulses, and changing the laser system to a second shutdown state includes halting the generation of laser pulses.

* * * * *